C. P. CONGER.
TOAST RACK.
APPLICATION FILED JUNE 12, 1907.
940,303. Patented Nov. 16, 1909.
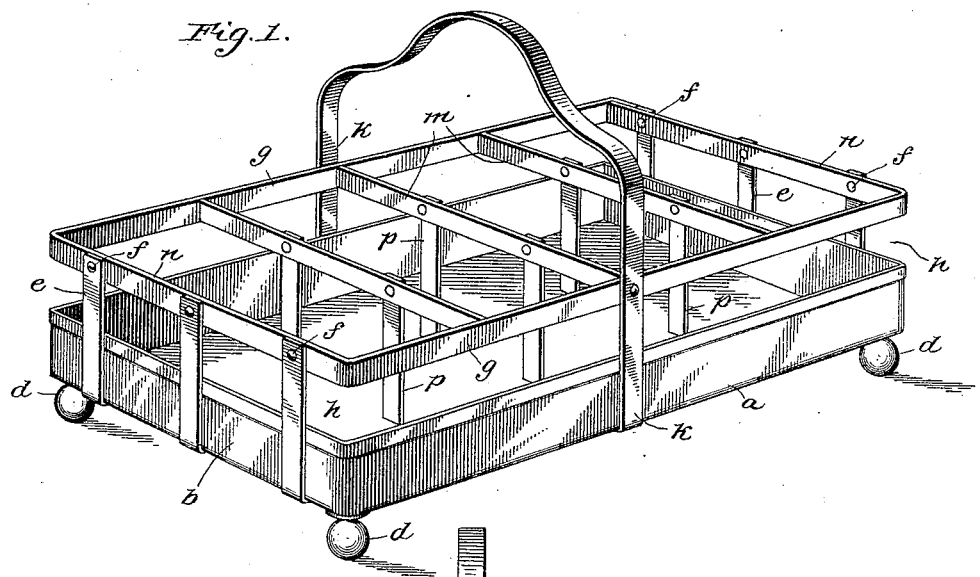
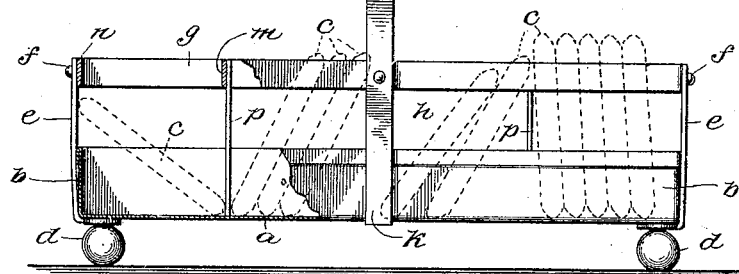
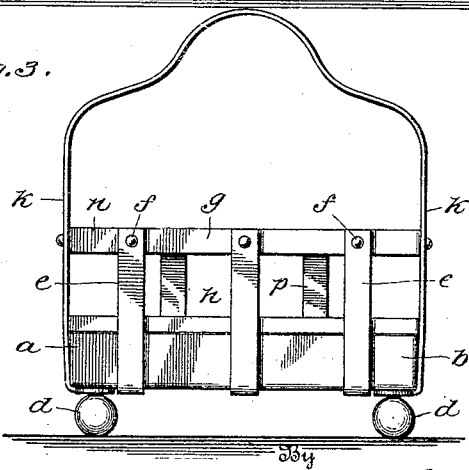
Witnesses
C. L. Taylor
George M. Anderson
Inventor
C. P. Conger
By
E. W. Anderson
his Attorney

UNITED STATES PATENT OFFICE.

CHILION P. CONGER, OF NEW YORK, N. Y.

TOAST-RACK.

940,303.

Specification of Letters Patent.   Patented Nov. 16, 1909.

Application filed June 12, 1907.   Serial No. 378,469.

*To all whom it may concern:*

Be it known that I, CHILION P. CONGER, a citizen of the United States, resident of New York, in the county of New York and State of New York, have made a certain new and useful Invention in Toast-Racks; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of the invention. Fig. 2 is a side view of the same, partly broken away, showing the triscuit or crackers in dotted lines. Fig. 3 is an end view of the rack.

The invention has relation to serving racks, designed especially for triscuit or crackers of definite form, and it consists in the novel construction and combinations of parts, as hereinafter set forth.

The object of the invention is mainly to provide means for serving hot triscuit in an acceptable manner.

In the accompanying drawings illustrating the invention, the letter $a$, designates a shallow pan or receptacle which forms the lower portion of the rack. This pan or receptacle is designed to be of rectangular form, and to have a wall $b$, rising from its bottom about an inch, or to a height which is much less than the breadth of the cracker or triscuit indicated at $c$. This pan is provided with bearings or feet $d$, located under the corner portions of its bottom.

To the pan base $a$, upon two opposite sides thereof are secured a plurality of upright arms or bars $e$, which extend upward from its sides and above the same a distance about equal to the height of said sides. To the upper ends of these side bars $e$, and within the same, is attached by means of rivets $f$, or otherwise, a narrow rectangular margin rail $g$, of similar shape to the rectangular side wall $b$, of the pan and of equal inclosure. The four sides of this marginal rail are designed to be located above and in the planes of the sides of the base pan, and are separated from the upper edge of said pan by the openings $h$, through which air is designed to have access to the toast or crackers, which rest edgewise in the rack. The height of the rail from the bottom of the pan is less than the breadth of one of the crackers, as indicated in the drawings. The upright bars $k$, at the other two opposite sides of the pan base and which are attached thereto and to the margin rail, are extended upward and connected in arch form over the middle portion of the rack, forming a convenient handle. Partition bars $m$, are arranged parallel to the sides $n$, of the marginal rail, and at a distance from said sides $n$, and from each other, when more than one is employed, less than the breadth of the triscuit or cracker for which the rack is designed. These partition bars $m$, are each connected to the bottom of the pan by means of upright bars $p$, which assist in forming the partition between two compartments of the rack. These compartments are designed in this way to be about as wide as they are deep from the margin rail to the bottom of the pan base.

When more than one of the partition bars $m$, are employed their number is always uneven and the handle bar is always located in the same plane as the central partition bar. In this case the partition bars throughout their length are separated from each other and from opposite sides of the marginal top rail by uninterrupted spaces. When only one partition bar is employed the handle bar is located in the same plane thereas, and opposite sides of the marginal top rail are separated therefrom throughout the length thereof by uninterrupted spaces.

By means of this rack, a number of crackers can be heated and carried to the serving table, and, as they are kept from falling flatwise on the bottom of the pan by the margin rail and partitions, they can be easily taken from the rack by their upper edges. Even when the last cracker in a compartment has fallen into slanting position, it can be readily reached through the open top and the openings in the sides of the compartments.

The base pan is designed not only to assist in keeping the crackers hot, but also to serve as a reservoir to catch the waste threads or fibers which are apt to become detached from crackers of this kind, when moved about in use.

Having described the invention, what I claim and desire to secure by Letters Patent is—

1. A rack for triscuit or crackers, including a quadrangular shallow pan having a solid bottom, upturned sides and marginal upright bars, a marginal top rail having connection with the upper end portions of said bars, a central transverse partition bar parallel to opposite sides of the marginal top rail and separated therefrom throughout its length by uninterrupted spaces whereby the rack is divided into compartments each of which extends entirely across the same, said partition bar having brace connection with the bottom of said pan, and an upright handle bar lying in the same plane as said partition bar.

2. A rack for triscuit or crackers, including a quadrangular shallow pan having a solid bottom, vertical sides and marginal upright bars, a marginal top rail having connection with the upper end portions of said bars, transverse partition bars parallel to opposite sides of the marginal top rail and separated throughout their length from each other and from the parallel sides of the marginal top rail by uninterrupted elongated spaces, and a handle bar.

In testimony whereof I affix my signature, in presence of two witnesses.

CHILION P. CONGER.

Witnesses:
L. H. CARR,
ETTA FARLEY.